United States Patent
Chiang

(12) 
(10) Patent No.: US 6,477,523 B1
(45) Date of Patent: Nov. 5, 2002

(54) SELECTIVITY PREDICTION WITH COMPRESSED HISTOGRAMS IN A PARALLEL PROCESSING DATABASE SYSTEM

(75) Inventor: Kuorong Chiang, Cerritos, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/454,798

(22) Filed: Dec. 3, 1999

(51) Int. Cl.[7] .............................................. G06F 17/30
(52) U.S. Cl. ........................................................ 707/2
(58) Field of Search ........................ 700/29; 707/103 R, 707/2; 705/36

(56) References Cited

U.S. PATENT DOCUMENTS

| | | | | |
|---|---|---|---|---|
| 6,094,657 A | * | 7/2000 | Hailpern et al. | 707/103 R |
| 6,108,647 A | * | 8/2000 | Poosala et al. | 702/180 |
| 6,112,126 A | * | 8/2000 | Hales et al. | 700/29 |
| 6,226,629 B1 | * | 5/2001 | Cossock | 707/3 |
| 6,272,487 B1 | * | 8/2001 | Beavin et al. | 707/2 |
| 6,360,214 B1 | * | 3/2002 | Ellis et al. | 707/2 |
| 6,363,371 B1 | * | 3/2002 | Chaudhuri et al. | 707/2 |
| 6,366,901 B1 | * | 4/2002 | Ellis | 707/2 |

* cited by examiner

*Primary Examiner*—Safet Metjahic
*Assistant Examiner*—Haythim J. Alaubaidi
(74) *Attorney, Agent, or Firm*—Gates & Cooper

(57) ABSTRACT

A method, apparatus, and article of manufacture for generating statistics for use by a relational database management system. A global aggregate spool is generated for each of a plurality of partitions of a subject table that are spread across a plurality of processing units of a computer system. Each of the global aggregate spools is scanned to generate summary records. The summary records are then merged to generate interval records for a compressed histogram of the subject table, wherein the compressed histogram includes both equal-height intervals and high-biased intervals. The compressed histogram can then be analyzed to estimate the cardinality associated with one or more search conditions of a user query or other SQL statement. Compared to a strictly equal-height histogram, the compressed histogram allows the relational database management system to more accurately estimate the cardinality associated with various search conditions. As a result, the relational database management system can better optimize the execution of the user query.

75 Claims, 2 Drawing Sheets

SELECTIVITY PREDICTION WITH COMPRESSED HISTOGRAMS IN A PARALLEL PROCESSING DATABASE SYSTEM

BACKGROUND OF THE INVENTION

1. Field of the Invention

This invention relates in general to database management systems performed by computers, and in particular, to selectivity prediction with compressed histograms in a parallel processing database system.

2. Description of Related Art

Relational DataBase Management Systems (RDBMS) are well known in the art. In an RDBMS, all data is externally structured into tables. A table in an RDBMS is two dimensional, comprising rows and columns. Each column has a name, typically describing the type of data held in that column. As new data is added, more rows are inserted into the table. A user query selects some rows of the table by specifying clauses that qualify the rows to be retrieved based on the values in one or more of the columns.

Structured Query Language (SQL) statements allow users to formulate relational operations on the tables. One of the most common SQL statements executed by an RDBMS is the SELECT statement. The SELECT statement generally comprises the format: "SELECT <clause> FROM <clause> WHERE <clause> GROUP BY <clause> HAVING <clause > ORDER BY <clause >." The clauses generally must follow this sequence, but only the SELECT and FROM clauses are required.

Generally, the result of a SELECT statement is a subset of data retrieved by the RDBMS from one or more existing tables stored in the relational database, wherein the FROM clause identifies the name of the table or tables from which data is being selected. The subset of data is treated as a new table, termed the result table.

The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause.

The search condition typically comprises one or more predicates, each of which specify a comparison between two values comprising columns, constants or correlated values. Multiple predicates in the WHERE clause are themselves typically connected by Boolean operators.

Database statistics can be used by the RDBMS to optimize the execution of the SQL statements. For example, statistics may be used to estimate cardinality for a selection of records based on the search condition specified for one or more of the columns of the records. Intuitively, the more intervals in the statistics for the column at issue, the higher the accuracy of the cardinality estimation.

This can be argued from two extremes. At one extreme, there is only one interval. These "statistics" return an averaged number of rows per value as the estimate for all "simple selections" and this estimate remains the same for all values. This is the worst kind of statistics (though better than no statistics).

At the other extreme, there exists one interval for each distinct value in the column. This provides the perfect cardinality "estimation." However, this approach is impractical as the number of intervals can become arbitrarily large. So, a trade-off must occur. And obviously, there should be as many intervals as possible, such that the frequencies within a single interval are more uniform and at the same time, the storage overhead must be acceptable.

Therefore, it makes sense to group column values that have roughly equal frequency in the same equal-height interval. The smaller the variation among frequencies in the same interval, the better the cardinality estimation. In the extreme, of course, if there is only one value (thus one frequency in the interval, which provides a 100% accurate estimation for that particular value (which is called a loner). And, this is exactly the idea behind high-biased intervals.

High-biased intervals store explicit column values and frequencies, so that a 100% estimation accuracy is obtained for these loners. Moreover, the rest of the column values can be made more uniform, if the column values with highest frequencies are removed from the equal-height intervals and put into high-biased ones. This way, not only do loners receive perfect estimation, but non-loners also benefit from increased uniformity.

Using the above concepts, the present invention has developed various techniques for optimizing the performance of an RDBMS using improved database statistics. The specifics of these improvements are described in more detail hereinafter.

SUMMARY OF THE INVENTION

The present invention discloses a method, apparatus, and article of manufacture for generating statistics for use by a relational database management system. A global aggregate spool is generated for each of a plurality of partitions of a subject table that are spread across a plurality of processing units of a computer system. Each of the global aggregate spools is scanned to generate summary records. The summary records are then merged to generate interval records for a compressed histogram of the subject table, wherein the compressed histogram includes both equal-height intervals and high-biased intervals. The compressed histogram can then be analyzed to estimate the cardinality associated with one or more search conditions of a user query or other SQL statement. Compared to a strictly equal-height histogram, the compressed histogram allows the relational database management system to more accurately estimate the cardinality associated with various search conditions. As a result, the relational database management system can better optimize the execution of the user query.

An object of the present invention is to collect improved database statistics. Another object of the present invention is to improve the performance of relational database management systems using the improved statistics.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
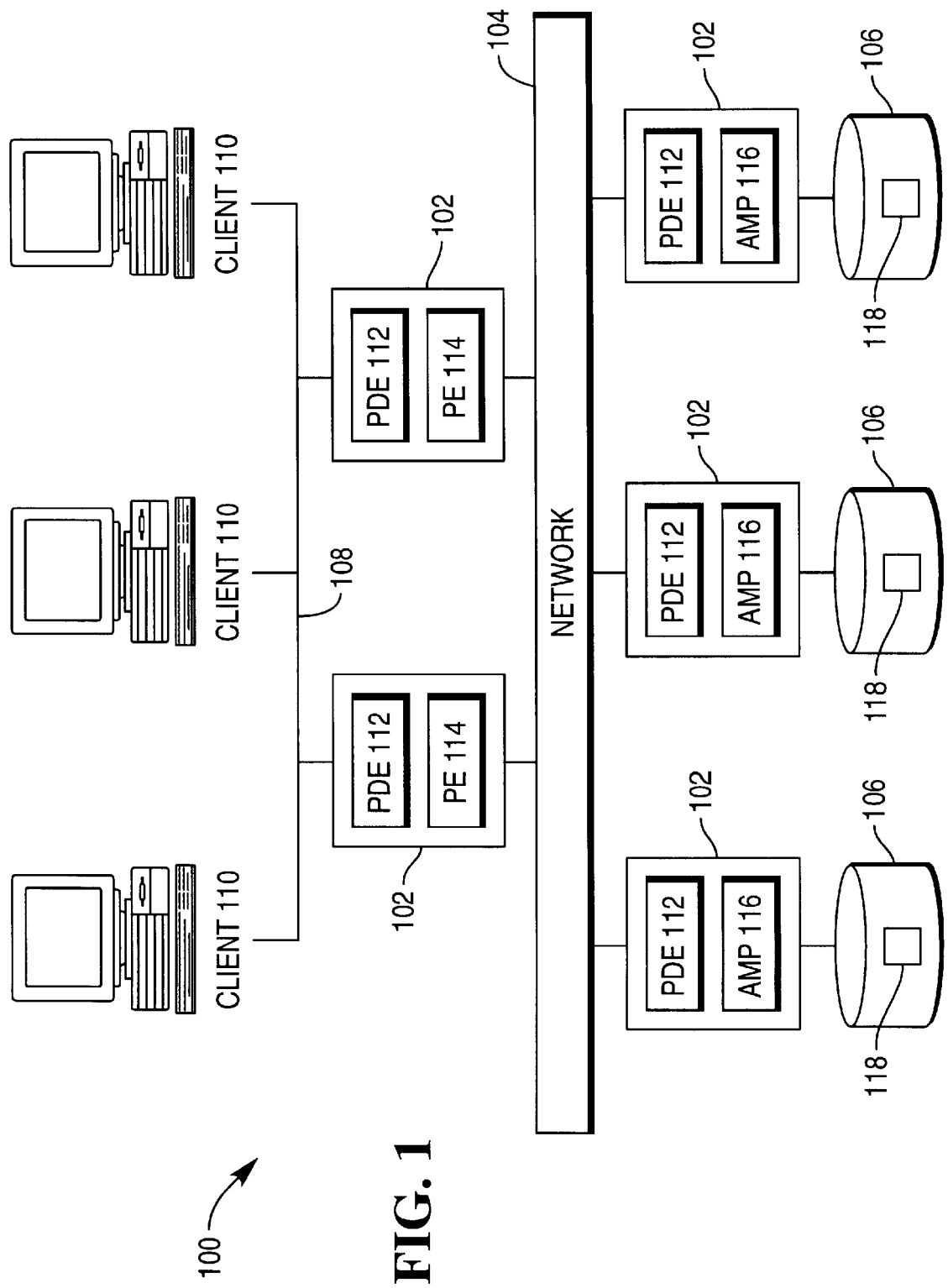
FIG. 1 illustrates an exemplary software and hardware environment that could be used with the present invention.

In the following description of the preferred embodiment, reference is made to the accompanying drawings which form a part hereof, and in which is shown byway of illustration a specific embodiment in which the invention may be practiced. It is to be understood that other embodiments may be utilized and structural changes may be made without departing from the scope of the present invention.

Overview

The preferred embodiment of the present invention generates a new kind of database statistics, known as a compressed histogram, for use by the RDBMS. The compressed histogram provides better estimates than an equal-height histogram, because high-biased intervals are included in the compressed histogram. Compared to the equal-height histogram, the compressed histogram allows the RDBMS to more accurately estimate the cardinality associated with various search conditions. As a result, the RDBMS can better optimize the execution of SQL statements.

Definitions

Following are definitions used throughout this specification.

Interval records are defined by five fields: Values, Mode, ModeFreq, MaxVal, and Rows. The information stored in these fields depends on whether the Intervals are High-Biased Intervals or Equal-Height Intervals.

The following table describes the High-Biased Intervals:

| Interval Type | Field | Definition | |
|---|---|---|---|
| High-Biased | Values | Representation for the number of loners in the interval. | |
| | | When the interval stores this many loners | Then the Values field is set to . . . |
| | | . . . | |
| | | 1 | −1 |
| | | 2 | −2 |
| | Mode | Smaller loner. | |
| | ModeFreq | Number of rows having the modal value. | |
| | MaxVal | Maximum value for the interval. | |
| | | The field is defined as the . . . | When the interval contains this many loners . . . |
| | | larger loner | 2 |
| | | modal value | 1 |
| | Rows | Number of rows having the MaxVal value. | |

The following table describes the Equal-Height Intervals:

| Interval Type | Field | Definition |
|---|---|---|
| Equal-Height | Values | Total number of values for all the non-modal values in this interval. |
| | Mode | Most frequent value in the interval. |
| | ModeFreq | Number of rows having the modal value. |
| | MaxVal | Maximum value covered by the interval. |
| | Rows | Total number of rows for the non-modal values in the interval. |

Note that high-biased intervals are characterized by having their Values field equal to −1 or −2. Equal-height intervals have their Values field equal to or greater than 0. For a high-biased interval with its Values field equal to −1, a single value (called a loner) is stored in the Mode of the interval. If the Values field is equal to −2, then two loners are stored in the high-biased interval: a first loner in the Mode field and a second loner in MaxVal field. A count of rows is stored in the ModeFreq field for the first loner and is stored in the Rows field for the second loner.

Loner—a distinct value that is stored in a high-biased interval.

Equal-Height Histogram—an array of ordered equal-height intervals.

Compressed Histogram—an array of intervals which comprises high-biased or equal-height intervals, or both. In the latter situation, high-biased intervals are ordered before the equal-height intervals.

Global Interval Size—the average number of rows to be fitted in one interval. In one embodiment, this is set to be the total number of rows in the table divided by 100.

Local Interval Size—the Global Interval Size divided by the number of processing units in the system.

Environment

FIG. 1 illustrates an exemplary hardware and software environment that could be used with the present invention. In the exemplary environment, a computer system 100 is comprised of one or more processing units (PUs) 102, also known as processors or nodes, which are interconnected by a network 104. Each of the PUs 102 is coupled to zero or more fixed and/or removable data storage units (DSUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 typically use a workstation 110, terminal, computer, or other input device to interact with the computer system 100. This interaction generally comprises queries that conform to the Structured Query Language (SQL) standard, and invoke functions performed by Relational DataBase Management System (RDBMS) software executed by the system 100.

In the preferred embodiment of the present invention, the RDBMS software comprises the Teradata® product offered by NCR Corporation, and includes one or more Parallel Database Extensions (PDEs) 112, Parsing Engines (PEs) 114, and Access Module Processors (AMPs) 116. These components of the RDBMS software perform the functions necessary to implement the RDBMS and SQL standards, i.e., definition, compilation, interpretation, optimization, database access control, database retrieval, and database update.

Work is divided among the PUs 102 in the system 100 by spreading the storage of a partitioned relational database 118 managed by the RDBMS software across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMP 116 managing the DSUs 106 that store the subset of rows.

The PEs 114 handle communications, session control, optimization and query plan generation and control. The PEs 114 fully parallelize all functions among the AMPs 116. As a result, the system of FIG. 1 applies a multiple instruction stream, multiple data stream (MIMD) concurrent processing architecture to implement a relational database management system 100.

Both the PEs 114 and AMPs 116 are known as "virtual processors" or "vprocs". The vproc concept is accomplished by executing multiple threads or processes in a PU 102, wherein each thread or process is encapsulated within a vproc. The vproc concept adds a level of abstraction between the multi-threading of a work unit and the physical layout of the parallel processing computer system 100. Moreover, when a PU 102 itself is comprised of a plurality of processors or nodes, the vproc concept provides for intra-node as well as the inter-node parallelism.

The vproc concept results in better system 100 availability without undue programming overhead. The vprocs also provide a degree of location transparency, in that vprocs communicate with each other using addresses that are vproc-specific, rather than node-specific. Further, vprocs facilitate redundancy by providing a level of isolation/abstraction between the physical node 102 and the thread or process. The result is increased system 100 utilization and fault tolerance.

The system 100 does face the issue of how to divide a query or other unit of work into smaller sub-units, each of which can be assigned to an AMP 116. In the preferred embodiment, data partitioning and repartitioning may be performed, in order to enhance parallel processing across multiple AMPs 116. For example, the data may be hash partitioned, range partitioned, or not partitioned at all (i.e., locally processed). Hash partitioning is a partitioning scheme in which a predefined hash function and map is used to assign records to AMPs 116, wherein the hashing function generates a hash "bucket" number and the hash bucket numbers are mapped to AMPs 116. Range partitioning is a partitioning scheme in which each AMP 116 manages the records falling within a range of values, wherein the entire data set is divided into as many ranges as there are AMPs 116. No partitioning means that a single AMP 116 manages all of the records.

Generally, the PDEs 112, PEs 114, and AMPs 116 are tangibly embodied in and/or accessible from a device, media, carrier, or signal, such as RAM, ROM, one or more of the DSUs 106, and/or a remote system or device communicating with the computer system 100 via one or more of the DCUs 108. The PDEs 112, PEs 114, and AMPs 116 each comprise logic and/or data which, when executed, invoked, and/or interpreted by the PUs 102 of the computer system 100, cause the necessary steps or elements of the present invention to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Execution of SQL Queries

Figure 2:
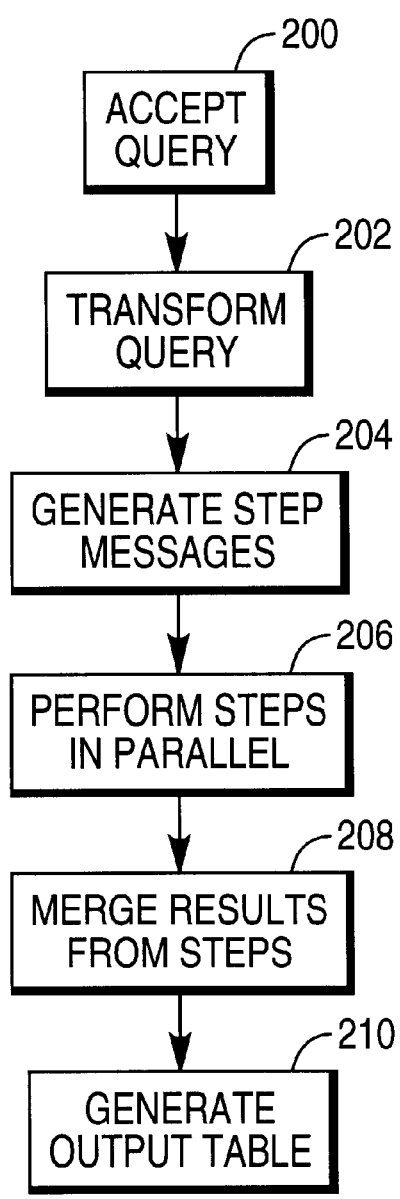
FIG. 2 is a flow chart illustrating the steps necessary for the interpretation and execution of SQL statements, or other user interactions, according to the preferred embodiment of the present invention.

FIG. 2 is a flowchart illustrating the steps necessary for the interpretation and execution of user queries or other SQL statements according to the preferred embodiment of the present invention.

Block 200 represents SQL statements being accepted by the PE 114.

Block 202 represents the SQL statements being transformed by a Compiler or Interpreter subsystem of the PE 114 into an execution plan. Moreover, an Optimizer subsystem of the PE 114 may transform or optimize the execution plan using database statistics generated in a manner described in more detail later in this specification.

Block 204 represents the PE 114 generating one or more "step messages" from the execution plan, wherein each step message is assigned to an AMP 116 that manages the desired records. As mentioned above, the rows of the tables in the database 118 maybe partitioned or otherwise distributed among multiple AMPs 116, so that multiple AMPs 116 can work at the same time on the data of a given table. If a request is for data in a single row, the PE 114 transmits the steps to the AMP 116 in which the data resides. If the request is for multiple rows, then the steps are forwarded to all participating AMPs 116. Since the tables in the database 118 maybe partitioned or distributed across the DSUs 16 of the AMPs 116, the workload of performing the SQL query can be balanced among AMPs 116 and DSUs 16.

Block 204 also represents the PE 114 sending the step messages to their assigned AMPs 116.

Block 206 represents the AMPs 116 performing the required data manipulation associated with the step messages received from the PE 114, and then transmitting appropriate responses back to the PE 114.

Block 208 represents the PE 114 then merging the responses that come from the AMPs 116.

Block 210 represents the output or result table being generated.

Operation of the Preferred Embodiment

According to the preferred embodiment of the present invention, a new kind of database statistics, known as a compressed histogram, are generated for use by the Optimizer subsystem of the PE 114 in optimizing an execution plan. The compressed histogram includes high-biased intervals and/or equal-height intervals that allow the Optimizer subsystem of the PE 114 to more accurately estimate the cardinality associated with various conditions of the execution plan.

Typically, the compressed histogram is independently generated for a specified subject table and then stored as a single field of a row in a system table in the relational database 118 for later use by the Optimizer subsystem of the PE 114. The PE 114 is responsible for generating the compressed histogram, using a sequence of collection steps sent to and performed by the AMPs 116. In the preferred embodiment, there are two statistics collection steps.

A first collection step is responsible for building a global aggregate spool and a sequence of summary records on each AMP 116 participating in the statistics collection (i.e., on each AMP 116 that manages a partition of the subject table), wherein multiple copies of the first collection step are executed simultaneously and in parallel by the AMPs 116. In this manner, the global aggregate spool may be considered partitioned in the same manner as the subject table.

Each row of the global aggregate spool includes: (1) a distinct value from the partition of the subject table and (2) the number of rows in the partition of the subject table having the distinct value. The global aggregate spool is considered global in the sense that a distinct value from the subject table can only be found on a single AMP 116, because the subject table is partitioned across multiple AMPs 116.

Summary records are constructed from the glob aggregate spool, wherein each summary record includes: (1) a sort key, (2) a distinct value, and (3) the number of rows in the partition of the subject table having the distinct value. These summary records are produced by scanning the global aggregate spool and merging global aggregate rows, wherein the scanning and merging are performed by all of the participating AMPs 116.

After initializing a first current summary record with the first row of the global aggregate spool, the AMP 116 loops to read all of the rows of the global aggregate spool; upon completion, the logic terminates. As each row of the global aggregate spool is read, if the accumulated count is less than or equal to the Local Interval Size, then the current row is merged into the summary record; otherwise, the summary record is sent to the coordinator AMP 116 and the next summary record is initialized to the current row. If, at anytime, the count of a row of the global aggregate spool is greater than or equal to the Loner criteria, then the summary record's count field is set to (−1)*(row's count) and the summary record is sent to the coordinator AMP 116.

The frequency of a newly retrieved row from the global aggregate spool is checked to see if the row qualifies as a loner. A loner is a distinct value satisfying the condition:

$$f \geq \frac{T}{L}$$

where f=frequency of the loner, T is the total number of rows in the table, and L is the maximum number of loners (e.g., 200). If the row qualifies as a loner, then the summary record is generated and sent directly to the coordinator AMP 116, without the summary record being merged with any other records prior to being sent to the coordinator AMP 116.

Conceptually, the summary records can be viewed as a second level aggregation on the global aggregate spool. This extra level of aggregation is necessary, because the sum of all the global aggregate spools from all of the AMPs 116 may be too large to be accommodated by a single AMP 116. With the two level aggregation, the maximum number of summary records sent to the coordinator AMP 116 is approximately 100*(Number of AMPs 116).

After receiving the summary records from all participating AMPs 116, the second collection step executed by the coordinator AMP 116 generates the Interval Records in conjunction with the participating AMPs 116. The summary records are scanned twice: first for constructing the High-Biased Intervals, and then second for constructing the Equal-Height Intervals. The High-Biased Intervals are completely specified at this time (i.e., all five fields are properly set) while the Equal-Height Intervals are only partially initialized (i.e., only the MaxVal field is set). All of the Interval Records are then sent to all participating AMPs 116, which fill in the details for the Equal-Height Intervals, i.e., Mode, ModeFreq, MaxVal, and Rows, while ignoring the High-Biased Intervals.

After processing by the second collection step, the compressed histogram stores only a specified number of Interval Records. In the preferred embodiment, the maximum number of records is 100, although other embodiments may use different values. This final version of the compressed histogram is then stored in the database 118 for later use by the Optimizer function of the PE 114.

Thereafter, the Optimizer subsystem of the PE 114 uses the compressed histogram to provide cardinality information for relations. Cardinality is the number of rows per AMP 116 that are selected from a relation satisfying conditions in a WHERE clause.

Logic of the Preferred Embodiment

Figure 3:
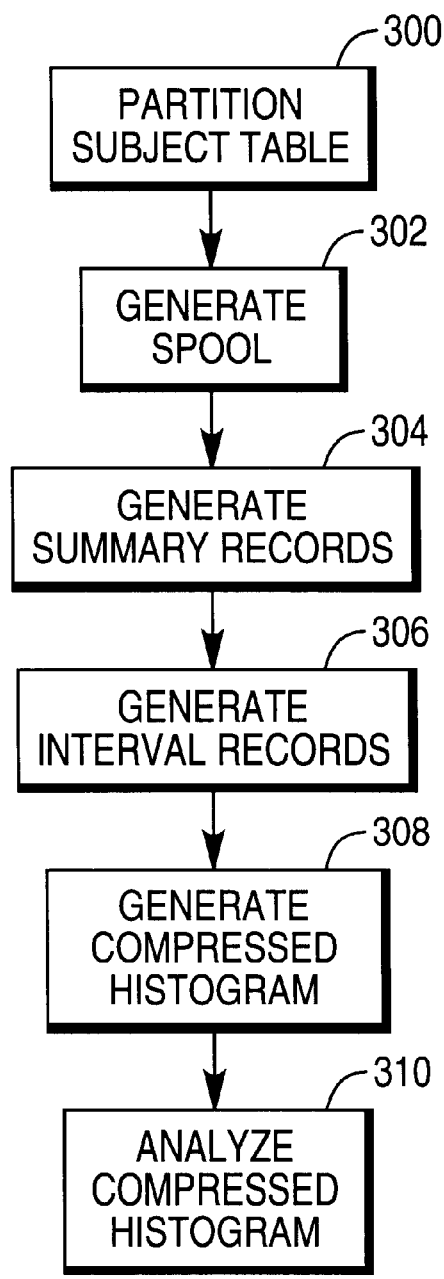
FIG. 3 is a flowchart that illustrates the logic for generating statistics for records stored in a subject table according to the preferred embodiment of the present invention.

FIG. 3 is a flowchart that illustrates the logic performed according to the preferred embodiment of the present invention. Specifically, this flowchart illustrates the logic for generating statistics for records stored in the subject table.

Block 300 represents the subject table being partitioned across a plurality of PUs 102 of the computer system 102, wherein each of the PUs 102 manages at least one partition of the subject table.

Block 302 represents each of partitions of the subject table being scanned to generate global aggregate spools.

Block 304 represents summary records being constructed from each of the global aggregate spools and sent to the coordinator AMP 116.

Block 306 represents Interval Records being generated by the coordinator AMP 116 and participating AMPs 116.

Block 308 represents a compressed histogram for the subject table being generated from the Interval Records, wherein the compressed histogram includes both Equal-Height Intervals and/or High-Biased Intervals.

Block 310 represents the compressed histogram being analyzed to estimate cardinality associated with one or more search conditions of a user query or other SQL statement.

Note that the "two phases" of statistics represented by Blocks 308 and 310, i.e., collecting statistics and using statistics, are independent of one another. Usually, the statistics are collected on various fields by explicitly issuing "collect statistics" statements. Thereafter, the collected statistics are used by the Optimizer subsystem of the PE 114 when processing a query. The arrow between Blocks 308 and 310 are not meant to imply that, in order to use the statistics, the statistics have to be collected for every query. The only "dependency" between these Blocks is that the Optimizer subsystem cannot use the statistics or optimization, if they do not exist (i.e., have not been collected).

Conclusion

This concludes the description of the preferred embodiment of the invention. The following paragraphs describe some alternative embodiments for accomplishing the same invention.

In one alternative embodiment, any type of computer, such as a mainframe, minicomputer, web sever, workstation, or personal computer, could be used to implement the present invention. In addition, any DBMS or other program that performs similar functions could be used with the present invention.

In another alternative embodiment, the partitions of the table need not be spread across separate data storage devices. Instead, the partitions could be stored on one or a few data storage devices simply to minimize the amount of temporary data storage required at each of the steps of the method.

In yet another alternative embodiment, the steps or logic could be performed by more or fewer processors, rather than the designated and other processors as described above. For example, the steps could be performed simultaneously on a single processor using a multi-tasking operating environment.

In summary, the present invention discloses a method, apparatus, and article of manufacture for generating statistics for use by a relational database management system A global aggregate spool is generated for each of a plurality of partitions of a subject table that are spread across a plurality of processing units of a computer system. Each of the global aggregate spools is scanned to generate summary records. The summary records are then merged to generate interval records for a compressed histogram of the subject table, wherein the compressed histogram includes both equal-height intervals and high-biased intervals. The compressed histogram can then be analyzed to estimate the cardinality associated with one or more search conditions of a user query or other SQL statement. Compared to a strictly equal-height histogram, the compressed histogram allows the relational database management system to more accurately estimate the cardinality associated with various search conditions. As a result, the relational database management system can better optimize the execution of the user query The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for generating statics for records stored in a subject table in a computer system, comprising:
   (a) generating a global aggregate spool for each of a plurality of partitions of a subject table stored on the computer system, wherein the partitions are stored across a plurality of processing units of the computer system;
   (b) constructing one or more summary records from each of the global aggregate spools;
   (c) generating one or more interval records from the summary records;
   (d) constructing a compressed histogram from the interval records, wherein the compressed histogram includes both equal-height intervals and high-biased intervals; and
   (e) analyzing the compressed histogram to estimate cardinality associated with one or more search conditions.

2. The method of claim 1, wherein the generating step (a) is performed simultaneously and in parallel by the processing units.

3. The method of claim 1, wherein the constructing step (b) is performed simultaneously and in parallel by the process units.

4. The method of claim 1, wherein the generating step (c) is performed by a coordinator processing unit.

5. The method of claim 1, wherein the constructing step (d) is performed by simultaneously and in parallel by the participating processing units and a coordinator processing unit.

6. The method of claim 1, wherein each of the interval records is comprised of one or more fields selected from a group comprising Values, Mode, ModeFreq, MaxVal, and Rows fields.

7. The method of claim 6, wherein values stored in the fields identify intervals as either equal-height intervals or high-biased intervals.

8. The method of claim 6, wherein the Values field in the high-biased interval represents a number of loners in the interval.

9. The method of claim 8, wherein the Mode field in the high-biased interval represents a first loner for the interval when the Values field represents the number of loners in the interval.

10. The method of claim 9, wherein the MaxVal field in the high-biased interval represents a second loner for the interval when the Mode field represents the first loner in the interval and the Values field represents the number of loners in the interval.

11. The method of claim 10, wherein the ModeFreq field in the high-biased interval represents a count of rows for the first loner.

12. The method of claim 11, wherein the Rows field in the high-biased interval represents a count of rows for the second loner.

13. The method of claim 6, wherein the Mode field in the high-biased interval represents a smaller loner.

14. The method of claim 6, wherein the ModeFreq field in the high-biased interval represents a number of rows having a modal value.

15. The method of claim 6, wherein the MaxVal field in the high-biased interval represents a maximum value for the interval.

16. The method of claim 6, wherein the Values field in the equal-heights interval represents a total number of values for all non-modal values in the interval.

17. The method of claim 6, wherein the Mode field in the equal-heights interval represents a most frequent value in the interval.

18. The method of claim 6, wherein the ModeFreq field in the equal-heights interval represents a number of rows having a modal value.

19. The method of claim 6, wherein the MaxVal field in the equal-heights interval represents a maximum value covered by the interval.

20. The method of claim 6, wherein the Rows field in the equal-heights interval represents a total number of rows for non-modal values in the interval.

21. The method of claim 1, wherein the summary record includes both a distinct value from the subject table and a number of rows in the subject table having the distinct value.

22. The method of claim 1, wherein a partition of the global aggregate spool resides on each of the processing units.

23. The method of claim 22, wherein each row of the global aggregate spool includes both a distinct value from the subject table and a number of rows in the subject table having the distinct value.

24. The method of claim 22, further comprising scanning the global aggregate spool to identify loners.

25. The method of claim 24, wherein a loner is a distinct value satisfying the condition:

$$f \geq \frac{T}{L}$$

where f=frequency of the loner, T is a total number of rows in the subject table, and L is a maximum number of loners.

26. An apparatus for generating statistics for records stored in a subject table in a computer system, comprising:
   (a) a computer system;
   (b) logic, performed by the computer system, for:
      (1) generating a global aggregate spool for each of a plurality of partitions of a subject table stored on the computer system, wherein the partitions are stored across a plurality of processing units of the computer system;
      (2) constructing one or more summary records from each of the global aggregate spools;
      (3) generating one or more interval records from the summary records;
      (4) constructing a compressed histogram from the interval records, wherein the compressed histogram includes both equal-height intervals and high-biased intervals; and
      (5) analyzing the compressed histogram to estimate cardinality associated with one or more search conditions.

27. The apparatus of claim 26, wherein the logic for generating (1) is performed simultaneously and in parallel by the processing units.

28. The apparatus of claim 26, wherein the logic for constructing (2) is performed simultaneously and in parallel by the processing units.

29. The apparatus of claim 26, wherein the logic for generating (3) is performed by a coordinator processing unit.

30. The apparatus of claim 26, wherein the logic for constructing (4) is performed by simultaneously and in parallel by the participating processing units and a coordinator processing unit.

31. The apparatus of claim 26, wherein each of the interval records is comprised of one or more fields selected from a group comprising Values, Mode, ModeFreq, MaxVal, and Rows fields.

32. The apparatus of claim 31, wherein values stored in the fields identify intervals as either equal-height intervals or high-biased intervals.

33. The apparatus of claim 31, wherein the Values field in the high-biased interval represents a number of loners in the interval.

34. The apparatus of claim 33, wherein the Mode field in the high-biased interval represents a first loner for the interval when the Values field represents the number of loners in the interval.

35. The apparatus of claim 34, wherein the MaxVal field in the high-biased interval represents a second loner for the interval when the Mode field represents the first loner in the interval and the Values field represents the number of loners in the interval.

36. The apparatus of claim 35, wherein the ModeFreq field in the high-biased interval represents a count of rows for the first loner.

37. The apparatus of claim 36, wherein the Rows field in the high-biased interval represents a count of rows for the second loner.

38. The apparatus of claim 31, wherein the Mode field in the high-biased interval represents a smaller loner.

39. The apparatus of claim 31, wherein the ModeFreq field in the high-biased interval represents a number of rows having a modal value.

40. The apparatus of claim 31, wherein the MaxVal field in the high-biased interval represents a maximum value for the interval.

41. The apparatus of claim 31, wherein the Values field in equal-heights interval represents a total number of values for all non-modal values in the interval.

42. The apparatus of claim 31, wherein the Mode field in the equal-heights interval represents a most frequent value in the interval.

43. The apparatus of claim 31, wherein the ModeFreq field in the equal-heights interval represents a number of rows having a modal value.

44. The apparatus of claim 31, wherein the MaxVal field in the equal-heights interval represents a maximum value covered by the interval.

45. The apparatus of claim 31, wherein the Rows field in the equal-heights interval represents a total number of rows for non-modal values in the interval.

46. The apparatus of claim 26, wherein the summary record includes both a distinct value from the subject table and a number of rows in the subject table having the distinct value.

47. The apparatus of claim 26, wherein a partition of the global aggregate spool resides on each of the processing units.

48. The apparatus of claim 47, wherein each row of the global aggregate spool includes both a distinct value from the subject table and a number of rows in the subject table having the distinct value.

49. The apparatus of claim 48, wherein the logic further comprises logic for scanning the global aggregate spool to identify loners.

50. The apparatus of claim 49, wherein a loner is a distinct value satisfying the condition:

$$f \geq \frac{T}{L}$$

where f=frequency of the loner, T is a total number of rows in the subject table, and L is a maximum number of loners.

51. An article of manufacture embodying logic for generating statistics for records stored in a subject table in a computer system, comprising:
  (a) generating a global aggregate spool for each of a plurality of partitions of a subject table stored on the computer system, wherein the partitions are stored across a plurality of processing units of the computer system;
  (b) constructing one or more summary records from each of the global aggregate spools;
  (c) generating one or more interval records from the summary records;
  (d) constructing a compressed histogram from the interval records, wherein the compressed histogram includes both equal-height intervals and high-biased intervals; and
  (e) analyzing the compressed histogram to estimate cardinality associated with one or more search conditions.

52. The method of claim 51, wherein the generating step (a) is performed simultaneously and in parallel by the processing units.

53. The method of claim 51, wherein the constructing step (b) is performed simultaneously and in parallel by the processing units.

54. The method of claim 51, wherein the generating step (c) is performed by a coordinator processing unit.

55. The method of claim 51, wherein the constructing step (d) is performed by simultaneously and in parallel by the participating processing units and a coordinator processing unit.

56. The method of claim 51, wherein each of the interval records is comprised of one or more fields selected from a group comprising Values, Mode, ModeFreq, MaxVal, and Rows fields.

57. The method of claim 56, wherein values stored in the fields identify intervals as either equal-height intervals or high-biased intervals.

58. The method of claim 56, wherein the Values field in the high-biased interval represents a number of loners in the interval.

59. The method of claim 58, wherein the Mode field in the high-biased interval represents a first loner for the interval when the Values field represents the number of loners in the interval.

60. The method of claim 59, wherein the MaxVal field in the high-biased interval represents a second loner for the interval when the Mode field represents the first loner in the interval and the Values field represents the number of loners in the interval.

61. The method of claim 60, wherein the ModeFreq field in the high-biased interval represents a count of rows for the first loner.

62. The method of claim 61, wherein the Rows field in the high-biased interval represents a count of rows for the second loner.

63. The method of claim 56, wherein the Mode field in the high-biased interval represents a smaller loner.

64. The method of claim 56, wherein the ModeFreq field in the high-biased interval represents a number of rows having a modal value.

65. The method of claim 56, wherein the MaxVal field in the high-biased interval represents a maximum value for the interval.

66. The method of claim 56, wherein the Values field in the equal-heights interval represents a total number of values for all non-modal values in the interval.

67. The method of claim 56, wherein the Mode field in the equal-heights interval represents a most frequent value in the interval.

68. The method of claim 56, wherein the ModeFreq field in the equal-heights interval represents a number of tows having a modal value.

69. The method of claim 56, wherein the MaxVal field in the equal-heights interval represents a maximum value covered by the interval.

70. The method of claim 56, wherein the Rows field in the equal-heights interval represents a total number of rows for non-modal values in the interval.

71. The method of claim 51, wherein the summary record includes both a distinct value from the subject table and a number of rows in the subject table having the distinct value.

72. The method of claim 51, wherein a partition of the global aggregate spool resides on each of the processing units.

73. The method of claim 72, wherein each row of the global aggregate spool includes both a distinct value from the subject table and a number of rows in the subject table having the distinct value.

74. The method of claim 72, further comprising scanning the global aggregate spool to identify loners.

75. The method of claim 74, wherein a loner is a distinct value satisfying the condition:

$$f \geq \frac{T}{L}$$

where f=frequency of the loner, T is a total number of rows in the subject table, and L is a maximum number of loners.

* * * * *

UNITED STATES PATENT AND TRADEMARK OFFICE
CERTIFICATE OF CORRECTION

| | | |
|---|---|---|
| PATENT NO. | : 6,477,523 B1 | Page 1 of 1 |
| APPLICATION NO. | : 09/454798 | |
| DATED | : November 5, 2002 | |
| INVENTOR(S) | : Chiang, K. | |

It is certified that error appears in the above-identified patent and that said Letters Patent is hereby corrected as shown below:

Column 9, Line 21, delete "statics" and insert - -statistics- -

Signed and Sealed this

Eighth Day of August, 2006

JON W. DUDAS
*Director of the United States Patent and Trademark Office*